Dec. 23, 1958     A. BARTHEL ET AL     2,866,060
ELECTRICAL RESISTANCE THERMOMETER OF LOW HEAT CAPACITY
Filed Feb. 4, 1955
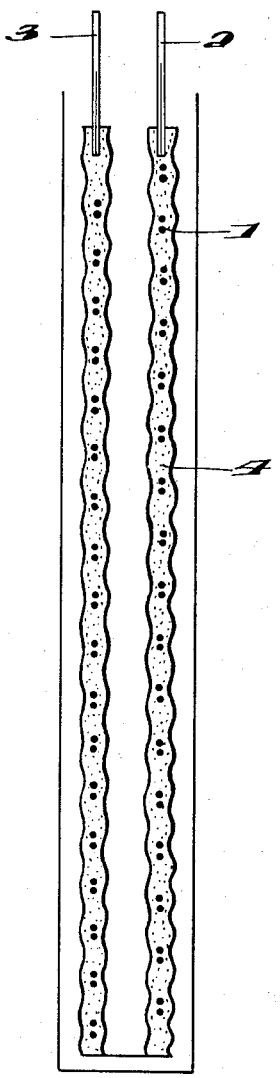
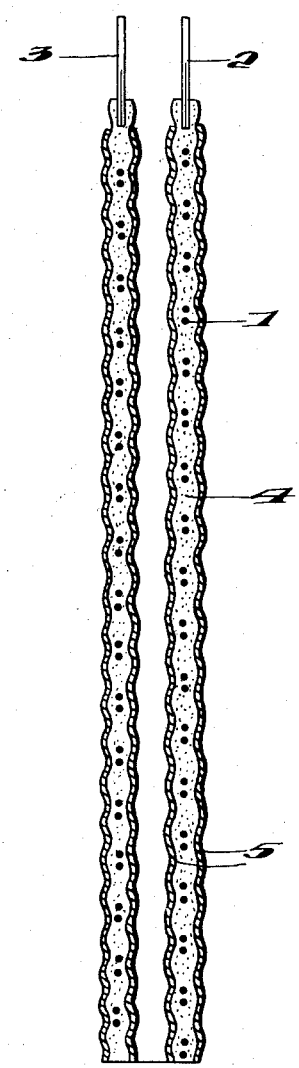
INVENTORS
AUGUST BARTHEL,
ALFRED HÄUSER,
BY
ATTORNEYS

# United States Patent Office 2,866,060
Patented Dec. 23, 1958

2,866,060

ELECTRICAL RESISTANCE THERMOMETER OF LOW HEAT CAPACITY

August Barthel and Alfred Häuser, Hanau (Main), Germany, assignors to Deutsche Gold- und Silber-Scheideanstalt vormals Roessler, Frankfurt am Main, Germany Application February 4, 1955, Serial No. 486,097

2 Claims. (Cl. 201—63)

This invention relates to an electrical resistance thermometer of low heat capacity for use in the measurement of high temperatures.

For the accurate measurement of temperatures in the approximate range of −200° C. to +550° C., it is the general practice to employ resistance thermometers, in which a suitable measuring resistance is fused into hardened glass. Resistance thermometers have also been described and proposed which are designed to permit the measurement of higher temperatures, for example by replacing the hardened glass support by carrier masses such as aluminum oxide or beryllium oxide, which are resistant to high temperature.

The sensitivity of the resistance thermometer depends on various factors, among which the mass of the carrier plays the most important part with regard to the speed of response. In resistance thermometers for use at high temperatures, this mass generally consists of materials having a low heat-conducting power, so that the instrument has a high heat capacity and accordingly is only able to respond slowly to variations in temperature. Moreover, such thermometers do not always satisfy all requirements as regards stability to changes in temperature, since the ceramic supports and also the ceramic protective casings may easily be destroyed by a sudden rise in temperature, which frequently also leads to damage to the measuring resistance, which is generally very sensitive.

The present invention provides an electrical resistance thermometer of low heat capacity for use in the measurement of high temperature, having a measuring resistance winding which is not carried on a separate winding support but is fixedly held within an insulating coating of ceramic material which covers and adheres directly to the winding on all sides.

The thermometer construction according to the invention is illustrated by way of example in the accompanying drawings, in which Fig. 1 diagrammatically shows a longitudinal section of a thermometer according to the invention and Fig. 2 diagrammatically shows a longitudinal section of a modified form of a thermometer according to the invention.

Since the thermometer according to the invention, in contrast to the hitherto usual constructions, has no separate winding support, the thermally inert mass thereof is extraordinarily small. In the thermometer of the invention, the measuring resistance is coated with a thin layer of electrically insulating highly refractory materials and this layer is at the same time used as holding means for the measurement winding. In order to form the coating which simultaneously insulates and supports the measuring resistance, metal oxides, preferably of high melting point, such for example as magnesium oxide, thorium oxide, titanium oxide or beryllium oxide, or mixtures of such oxides, are applied in a firmly adhering manner directly to and all around the said resistance. Aluminum oxide or masses mainly containing the said oxide have proved particularly suitable for this purpose. The coating layers are dried after being applied and consolidated by a suitable heat treatment at the sintering temperature of the substance which is used. With layers of aluminum oxide, the sintering is carried out at temperatures of, for example, 1200° C.

The application of such ceramic insulating layers to the measuring winding forming the measuring resistance may be effected in various ways. The cataphoretic deposition of the metal oxides on platinum has proved to be particularly suitable, since it is possible in this manner reliably to produce firmly adhering and substantially dense coatings. With this method of application, the procedure is that the measuring resistance is wound in any desired form, for example as a single winding, bifilar winding or double winding, or even as a reversed helix, onto a temporary support of suitable diameter and is then subjected to the cataphoretic treatment. In this way, the required oxide coating is formed on the outside of the winding, by which the individual turns are not only insulated, but are also to a certain degree fixed and supported. The temporary support or core is then removed, and thus the interior of the wire helix is exposed, and this is now also accessible to the oxide deposition. After drying and subsequent sintering, there is formed in this manner an arrangement such as shown diagrammatically by way of example in Fig. 1 of the accompanying drawings. In this figure, 1 represents the measurement winding with leads 2 and 3, the said winding being shown in section. In the present example, the winding 1 is a bifilar helix. It is completely surrounded by the oxide coating 4, which not only insulates the individual wires from one another, but imparts to the complete arrangement a sufficient stability without it being necessary, as was formerly the case, for the helix to be wound onto a permanent inner core. It is quite apparent that the resistance thermometer according to the present invention has a very low thermal capacity and consequently possesses a high response speed.

In accordance with its function, the auxiliary support or core consists of material which may be quickly and easily removed from the winding after the external insulating coating has been applied to the measuring resistance. Consequently, it is possible, for example, for paper or cardboard, low-melting organic substances, such as wax or stearin, or also readily soluble organic or inorganic substances, for example aluminum or Wood's metal, to be used as the temporary support. The temporary support can be removed by burning, melting or dissolving, according to the type of material which is used.

The coating layer may be applied by methods other than cataphoretic deposition. For example, the measuring wire or the complete measurement winding may first of all be coated with the metals forming the oxide, perhaps by dipping or spraying, and the coating thus obtained may then subsequently be transformed into the oxides. In order to develop coating layers from mixtures of aluminum oxide and silicon dioxide of the sillimanite type, for example, the measuring wire may initially be coated with an aluminum-silicon alloy, for example Silumin. This metallic coating is then converted into the corresponding oxides by treatment in air or an atmosphere containing oxygen at elevated temperature, so that the oxides form a firmly adhering coating on the measuring wire and thus simultaneously constitute an insulating and supporting layer. In this way, it is also possible to produce arrangements such as are shown in Fig. 1 which has been described above. When the initially applied metallic coating which is to be subsequently oxidized has a sufficient degree of deformability, it is not necessary to coat the complete winding, but it is possible to start with the simple wire and to form this into the required spiral or helix after coating it with a readily deformable metal, and only then effect the oxidation. When starting with pure aluminum as the coating, it is generally advisable for the oxidation of the coating layer to be carried out electrolytically.

When using wire of such thickness that the measuring resistance winding is sufficiently self-supporting, it may be possible to dispense entirely with a temporary support. In such cases, the helix may be coated while standing or hanging freely and the coating may then be hardened, as mentioned above, by baking.

In certain cases, it is even possible for the measurement winding to be introduced directly into the outer protective tube and to subject it in the latter to the cataphoretic treatment for the deposition of the superficial oxide layer. The measuring resistance is in this way covered with oxide on all sides and also between the individual turns and, if it is carefully handled and used at measuring positions which are free from vibrations, it may be installed immediately after drying, i. e. without the insulating oxide undergoing a separate sintering process. The hardening of the oxide layer is then effected gradually by the heating to which the resistance thermometer is subjected during use.

As already mentioned, the measuring resistances provided with an insulating and supporting oxide layer according to the invention may be housed in a protective tube, which consists, for example, of copper, corrosion-resisting steels or enamelled iron or the like, according to the requirements. In order further to improve the heat transfer to the measuring resistance and in order thereby to obtain an even more favorable power of response and an even higher degree of accuracy in measurement, it is also possible and advantageous for the oxide coating surrounding the measuring resistance to be coated with a thin metal layer, at least externally, but if necessary both externally and internally. Metals with a high heat-conducting capacity, such as, for example, silver or gold, which are also substantially resistant to corrosion, are expediently employed for the formation of this layer. The application of this metal sheathing to the oxide coating may be effected in manner known per se, for example by spraying or vaporising or cathodic atomisation, onto the said coating, or also by deposition of the suitable metals from their solutions or suspensions.

A resistance thermometer of the last-described kind is shown diagrammatically in Fig. 2 of the accompanying drawings. In this figure, 1 again indicates the measuring resistance with leads 2 and 3. A thin metal layer 5 is disposed on the outside and inside of the oxide coating 4 which completely surrounds the said resistance.

Owing to the low thermal inertia of the mass of the resistance thermometers according to the present invention, the said thermometers have a low heat capacity and are consequently particularly responsive and also stable to variations in temperature, since thermal stresses can only be set up to a small and harmless extent, even on sudden variations in temperature. By using suitable highly refractory oxide coatings, such thermometers may, if necessary, also be used for measuring temperatures higher than 1000° C., provided that the material of the protective tube is adapted to these measurement conditions.

One particular advantage of the resistance thermometer according to the invention is that in addition to being used in the conventional round form, it may also be curved or bent into other shapes which are frequently adapted to the actual purpose of measurement, for example to horseshoe or other shape, and may be used with an oval, prismatic or flattened cross-section.

What we claim is:

1. In an electrical resistance thermometer of low heat capacity for measurement of high temperatures, a measuring resistance winding supported only by a thin coating comprising an insulating ceramic material which covers and adheres directly to the winding on all sides and the winding is thereby held fixedly within such coating, said ceramic material being coated with a layer of at least one metal of high heat-conducting capacity.

2. An electrical resistance thermometer as claimed in claim 1, wherein the coating of ceramic material which holds and insulates the measuring resistance is coated with a layer of a precious metal selected from the group silver, gold and their alloys.

References Cited in the file of this patent

UNITED STATES PATENTS

| 845,413 | Haagn | Feb. 26, 1907 |
| 1,767,586 | Hudson | June 24, 1930 |
| 2,344,298 | Green | Mar. 14, 1944 |
| 2,703,833 | Hanvor | Mar. 8, 1955 |

FOREIGN PATENTS

| 674,484 | Great Britain | June 25, 1952 |